(12) United States Patent
Nakai

(10) Patent No.: US 8,731,731 B2
(45) Date of Patent: May 20, 2014

(54) POWER MANAGEMENT DEVICE AND POWER MANAGEMENT METHOD

(75) Inventor: Hidekazu Nakai, Tokyo (JP)

(73) Assignee: Sony Corporation, Tokyo (JP)

( * ) Notice: Subject to any disclaimer, the term of this patent is extended or adjusted under 35 U.S.C. 154(b) by 370 days.

(21) Appl. No.: 13/207,968

(22) Filed: Aug. 11, 2011

(65) Prior Publication Data

US 2012/0049808 A1     Mar. 1, 2012

(30) Foreign Application Priority Data

Aug. 27, 2010    (JP) ................................ P2010-190925

(51) Int. Cl.
     *G05D 11/00*      (2006.01)

(52) U.S. Cl.
     USPC ........................... 700/292; 323/234; 323/283

(58) Field of Classification Search
     USPC ................................... 700/292; 323/234, 283
     See application file for complete search history.

(56) References Cited

U.S. PATENT DOCUMENTS

| 6,246,221 B1 * | 6/2001 | Xi ................................. 323/280 |
| 2003/0095368 A1 * | 5/2003 | Daniels et al. ............... 361/93.9 |
| 2004/0164707 A1 * | 8/2004 | Veselic et al. ................. 320/128 |
| 2006/0236141 A1 * | 10/2006 | Chang et al. .................. 713/300 |
| 2008/0002509 A1 * | 1/2008 | You .......................... 365/230.05 |
| 2008/0252277 A1 * | 10/2008 | Sase et al. ..................... 323/283 |

FOREIGN PATENT DOCUMENTS

EP     2 113 983     4/2009

OTHER PUBLICATIONS

European Search Report issued Oct. 27, 2011 in Munich for corresponding European patent application No. EP 11 17 2470.

* cited by examiner

*Primary Examiner* — Mohammad Ali
*Assistant Examiner* — Anthony Whittington
(74) *Attorney, Agent, or Firm* — Finnegan, Henderson, Farabow, Garrett & Dunner LLP

(57) ABSTRACT

There is provided a power management device including a load current control unit configured to set an upper limit on a load current supplied from a connected feeding device and to control the load current on the basis of the upper limit, and a determination unit configured to, when the load current control unit has reset the upper limit to a higher value, determine if the upper limit has exceeded a current capacity of the feeding device on the basis of a voltage drop level of an input voltage. The load current control unit may reset the upper limit in increments or decrements of a predetermined value, and the load current control unit may, when the determination unit has determined that the upper limit had exceeded the current capacity of the feeding device, control the load current by resetting the upper limit to a value not exceeding the current capacity.

6 Claims, 12 Drawing Sheets

(a)

(b)

FIG. 1
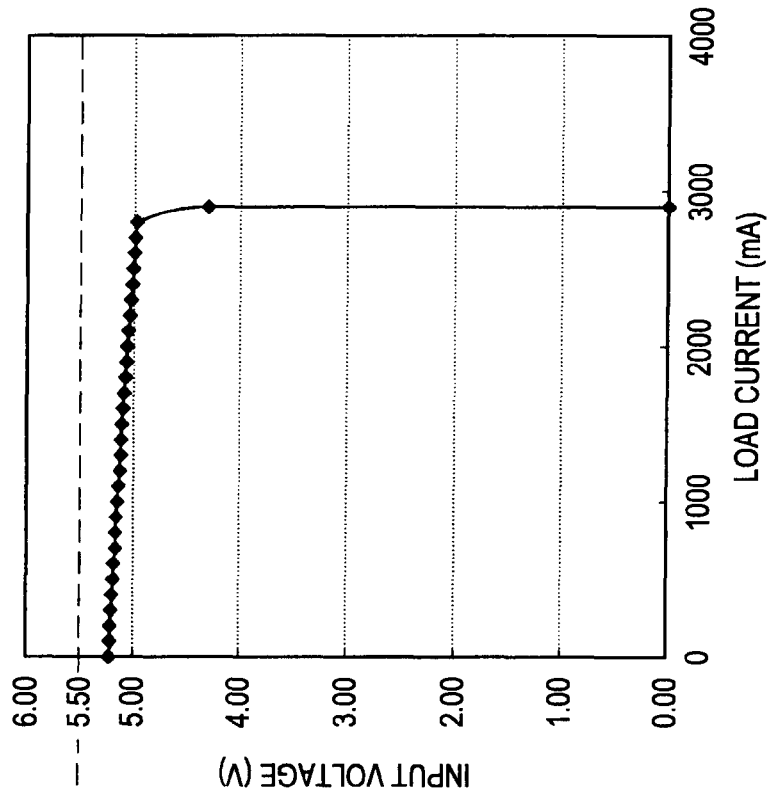
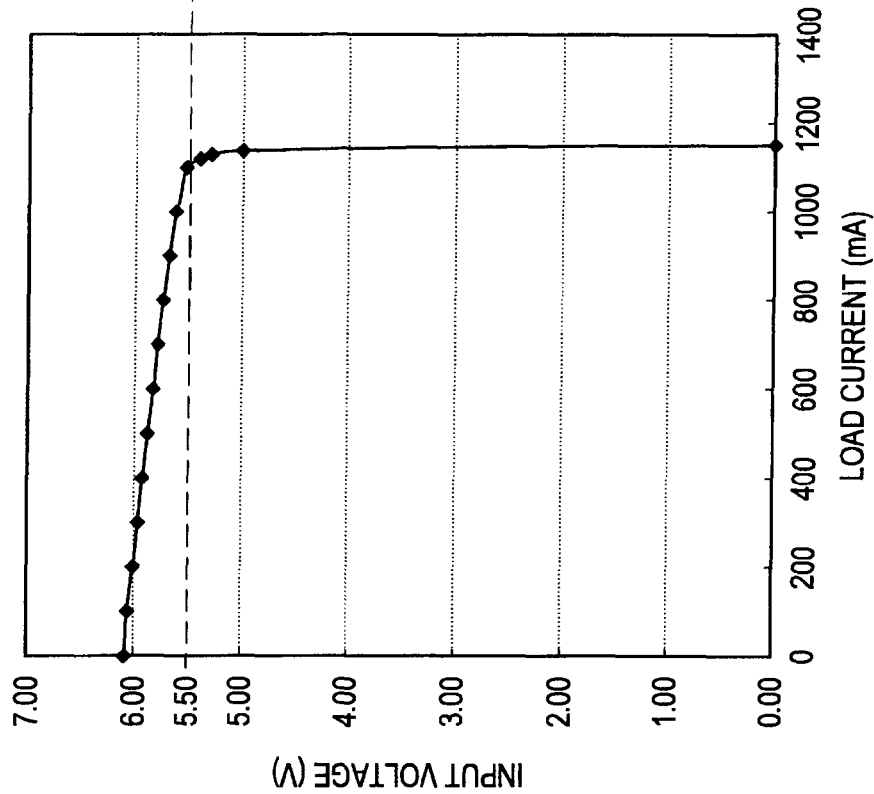

POWER MANAGEMENT DEVICE AND POWER MANAGEMENT METHOD

BACKGROUND

The present disclosure relates to a power management device and a power management method.

Devices that can feed power to other devices and devices that can receive power from other devices via standardized connectors such as devices connected via a USB (Universal Serial Bus) are now in widespread use.

SUMMARY

When devices are connected via a standardized connector as described above, there is a possibility that a device for feeding power (hereinafter also referred to as a "feeding device") whose current capacity varies from device to device may be connected to a device for receiving power (hereinafter also referred to as a "receiving device"). Feeding devices vary in their maximum load currents that can be supplied to receiving devices (i.e., feeding ability) depending on the specifications (e.g., current capacity and voltage) of devices that constitute the feeding devices. The maximum load current herein refers to the maximum load current of a load current, with which a protection circuit for protecting a feeding device from damage will not work (when a protection circuit is provided), or the maximum load current of a load current that will not cause damage to the feeding device (when a protection circuit is not provided).

That is, when devices are connected via a standardized connector as described above, there is a possibility that a feeding device whose load current that can be stably extracted by a receiving device (load current that does not exceed the maximum load current) is unknown may be connected to the receiving device. This is true for not only a case in which devices are connected via a standardized connector but also a case in which devices are connected via a nonstandardized connector. This is because there may be both cases in which, for example, a feeding device (a genuine feeding device) that has been manufactured by the same manufacturer or the like of a receiving device and thus corresponds to the receiving device is connected to the receiving device, and a feeding device (a so-called third-party manufactured feeding device) that has been manufactured by a third party different from the manufacturer or the like of a receiving device is connected to the receiving device.

Accordingly, in order to prevent damage to the feeding device that can occur if an excessive load is applied to the feeding device, and to prevent an interruption of power feeding to the receiving device that can occur if a protection circuit of the feeding device is activated, for example, it is necessary to control a load current extracted from the feeding device (e.g., to perform power management).

As the aforementioned power management method, the following method can be given, for example: monitoring a voltage input from the connected feeding device (hereinafter referred to as an "input voltage") and controlling a load current extracted from the feeding device on the basis of a comparison between the input voltage and a predetermined voltage-related threshold. More specifically, as the aforementioned power management method, the following method can be given, for example: determining that, when the input voltage has become less than or equal to a fixed voltage-related threshold (or has become less than the threshold), an excessive load has started to be applied to the feeding device, and controlling the load current so that the input voltage becomes greater than the fixed voltage-related threshold (or becomes greater than or equal to the threshold).

However, as there is a possibility that, for example, a feeding device whose output voltage varies from device to device may be connected to a receiving device as described above, the receiving device may not always be able to determine if an excessive load has started to be applied to the feeding device on the basis of a comparison between an input voltage and a fixed voltage-related threshold. Accordingly, even when the aforementioned power management method is used, there is a possibility that a larger load current may not be able to be stably extracted from the feeding device.

In light of the foregoing, it is desirable to provide a power management device and power management method, which are novel and improved, and which allow a larger load current to be stably extracted from a feeding device.

According to an embodiment of the present disclosure, there is provided a power management device including a load current control unit configured to set an upper limit on a load current supplied from a feeding device that is connected to the power management device and to control the load current on the basis of the set upper limit, and a determination unit configured to, when the load current control unit has reset the upper limit to a higher value, determine if the upper limit has exceeded a current capacity of the feeding device on the basis of a voltage drop level of an input voltage input from the feeding device. The load current control unit may reset the upper limit in increments or decrements of a predetermined value when changing the set upper limit, and the load current control unit may, when the determination unit has determined that the upper limit had exceeded the current capacity of the feeding device, control the load current by resetting the upper limit to a value not exceeding the current capacity.

According to the aforementioned configuration, a larger load current can be stably extracted from a feeding device.

The power management device may further include a power supply administration unit configured to manage power supply to the power management device or to the power management device and an external device. The load current control unit may compare the set upper limit with a total amount of current transmitted from the power supply administration unit, the total amount of current representing a total sum of current needed by the power management device or by the power management device and the external device. The load current control unit may increase the upper limit if the total amount of current is greater than the set upper limit, and may not increase the upper limit if the total amount of current is less than or equal to the set upper limit.

The load current control unit may separately set a time taken to reset the upper limit to a lower value and a time taken to reset the upper limit to a higher value. The load current control unit may, when resetting the upper limit to a lower value, reset the upper limit in a shorter time than a time taken to increase the upper limit.

The load current control unit may, when the determination unit has determined that the upper limit had exceeded the current capacity of the feeding device, reset the upper limit to a value that is lower than the currently set upper limit by the predetermined value.

The load current control unit may, after having reset the upper limit when the determination unit had determined that the upper limit had exceeded the current capacity of the feeding device, not set an upper limit that is greater than the reset upper limit.

The determination unit may, when the load current control unit has reset the set upper limit to a higher value, calculate a differential value between a first voltage drop level representing a voltage drop level at the current reset and a second voltage drop level representing a voltage drop level at the previous reset, and the determination unit may, if the differential value is greater than a predetermined threshold or is greater than or equal to the predetermined threshold, determine that the upper limit has exceeded the current capacity of the feeding device.

According to another embodiment of the present disclosure, there is provided a power management method including setting an upper limit on a load current supplied from a connected feeding device and controlling the load current by resetting the set upper limit in increments or decrements of a predetermined value, and determining, when the set upper limit has been reset to a higher value in the controlling step, if the upper limit has exceeded a current capacity of the feeding device on the basis of a voltage drop level of an input voltage input from the feeding device. In the controlling step, if the upper limit is determined to have exceeded the current capacity of the feeding device in the determining step, the load current is controlled by resetting the upper limit to a value not exceeding the current capacity.

With the aforementioned method, a larger load current can be stably extracted from the feeding device.

According to the present disclosure, a larger load current can be stably extracted from a feeding device.

BRIEF DESCRIPTION OF THE DRAWINGS

FIG. 1 is an explanatory diagram illustrating a power management method based on a comparison between an input voltage and a fixed voltage-related threshold;

DETAILED DESCRIPTION OF THE EMBODIMENTS

Figure 2:
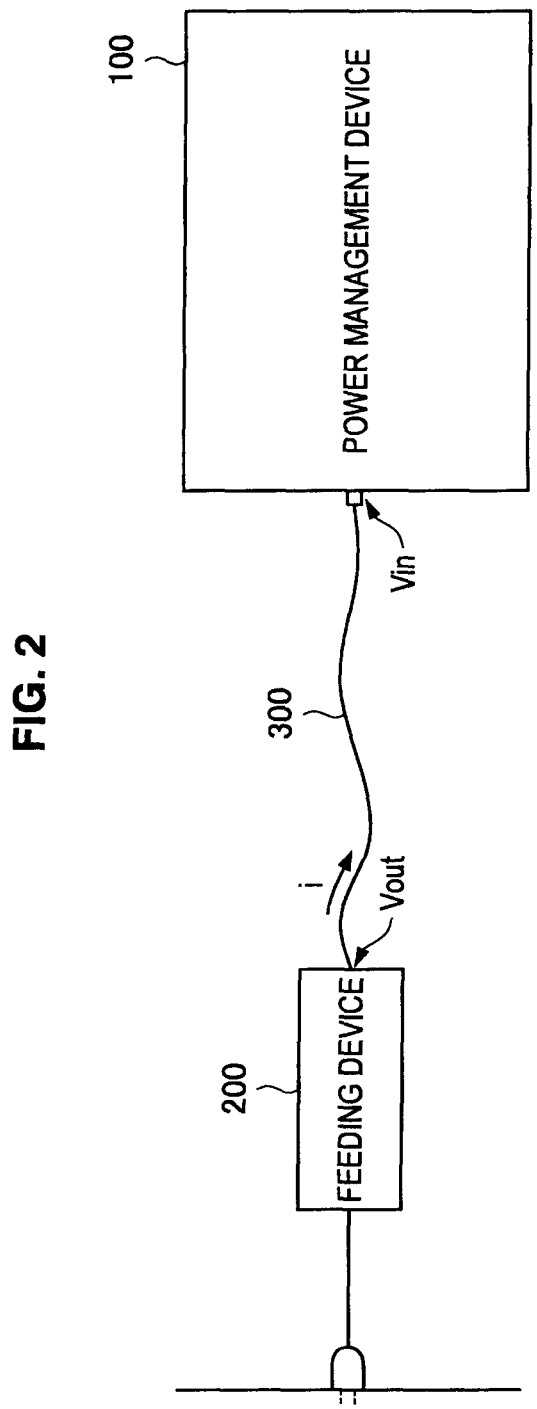
FIG. 2 is an explanatory diagram illustrating the principle of a determination related to a first power management approach in accordance with an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be hereinafter given in the following order.

1. Approach in Accordance with Embodiment of the Present Disclosure
2. Power Management Device in Accordance with Embodiment of the Present Disclosure
3. Program in Accordance with Embodiment of the Present Disclosure Approach in Accordance with Embodiment of the Present Disclosure Prior to the description of the configuration of a power management device (hereinafter also referred to as a "power management device 100") in accordance with an embodiment of the present disclosure, a power management approach in accordance with an embodiment of the present disclosure will be described.

Hereinafter, an example in which the power management device 100 is the aforementioned receiving device will be mainly described. However, the power management device 100 in accordance with the embodiment of the present disclosure is not limited thereto, and can be a power management IC (Integrated Circuit) that is built in a receiving device, for example. In addition, in the following description, a feeding device that is connected to the power management device 100 may be referred to as a "feeding device 200." Herein, the term "connected" in accordance with the embodiment of the present disclosure means that the power management device 100 and the feeding device 200 are connected via a wire such as a cable or are connected wirelessly. In addition, a process related to the power management approach in accordance with the embodiment of the present disclosure described below can be construed as a process related to the power management method in accordance with the embodiment of the present disclosure.

As described above, there is a possibility that a feeding device 200 whose stably extractable load current (load current that does not exceed the maximum load current, hereinafter the same) varies from device to device may be connected to the power management device 100. Thus, when power feeding and reception are performed between the connected feeding device 200 and the power management device 100, undesirable situations such as those stated in (a) to (d) below can occur as a load current that can be stably extracted from the feeding device 200 by the power management device 100 is unknown.

(a) An excessive load can be applied to the feeding device 200, which in turn will cause excessive heat generation in the feeding device 200 or burnout or damage of the feeding device 200, for example.

(b) In a case in which the feeding device 200 has a protection circuit, if an excessive load is applied to the feeding device 200, the protection circuit will be activated, which in turn will prevent the power management device 100 from extracting a load current from the feeding device 200.

(c) In a case in which the power management device 100 has an internal power supply such as a battery, limiting a load current to be extracted from the feeding device 200 by the power management device 100 more than necessary will prolong the charging time for the internal power supply.

(d) In a case in which the power management device 100 has an internal power supply such as a battery, limiting a load current to be extracted from the feeding device 200 by the power management device 100 more than necessary will make it impossible to drive the power management device 100 with the sole use of the load current, and thus the internal power supply will start discharging.

Herein, as an example of a power management method for preventing occurrence of the aforementioned undesirable situations, the following method can be given, as described above: monitoring an input voltage with the power management device 100 and controlling a load current extracted from the feeding device 200 on the basis of a comparison between the input voltage and a predetermined voltage-related threshold. FIG. 1 is an explanatory diagram illustrating a power management method based on a comparison between an input voltage and a fixed voltage-related threshold. Herein, FIG. 1 shows an example in which the fixed voltage-related threshold is set to 5.50 [V].

In a case in which a fixed voltage-related threshold is provided to determine if an excessive load has started to be applied to the feeding device 200, for example, it is determined that an excess load has started to be applied to the feeding device 200 when the input voltage has become less than or equal to the fixed threshold (or has become less than the threshold). When it is determined that an excessive load has started to be applied to the feeding device 200, the aforementioned load current is controlled so that the input voltage becomes greater than the fixed voltage-related threshold (or becomes greater than or equal to the threshold).

Herein, as shown in FIG. 1(a), if an input voltage of when no excessive load is applied to the connected feeding device 200 (when a load current can be stably extracted) is greater than the aforementioned fixed voltage-related threshold, for example, the aforementioned determination can be performed by using the aforementioned power management method, without causing any particular problem. However, there is a possibility that a feeding device 200 whose output voltage (i.e., input voltage of the power management device 100) of when no excessive load is applied to the feeding device 200 is lower than the aforementioned fixed voltage-related threshold as shown in FIG. 1(b), for example, may be connected to the power management device 100. In such a case, even if the aforementioned power management method is used, it would be difficult to determine if an excessive load has started to be applied to the feeding device 200.

Thus, even when the aforementioned power management method that uses a fixed voltage-related threshold is employed, it would not be always possible to determine if an excessive load has started to be applied to the feeding device 200 on the basis of a comparison between the input voltage and the fixed voltage-related threshold.

[1] First Power Management Approach

Thus, the power management device 100 in accordance with an embodiment of the present disclosure sets an upper limit on a load current extracted from the feeding device 200, and resets (adjusts) the upper limit in increments/decrements of a predetermined value. Then, the power management device 100, upon resetting the upper limit to a higher value, determines if the upper limit has exceeded the current capacity of the feeding device 200 (i.e., if an excessive load has started to be applied to the feeding device 200) on the basis of a voltage reduction level (a voltage drop level) of the input voltage that is input from the feeding device 200.

More specifically, the power management device 100 monitors the input voltage, and calculates, upon resetting the currently set upper limit to a higher value, the differential value between a voltage drop level corresponding to the current reset (a first voltage drop level) and a voltage drop level corresponding to the previous reset (a second voltage drop level). Then, the power management device 100, if the differential value is greater than a predetermined threshold related to the voltage drop level (or is greater than or equal to the predetermined threshold, hereinafter the same), determines that the upper limit has exceeded the current capacity of the feeding device 200. Herein, each time the power management device 100 has reset the upper limit to a higher value, for example, the power management device 100 performs the aforementioned determination by storing information on the voltage drop level.

[Principle of Determination Related to First Power Management Approach]

Hereinafter, the principle of a determination related to the first power management approach in accordance with an embodiment of the present disclosure will be described. FIG. 2 is an explanatory diagram illustrating the principle of a determination related to the first power management approach in accordance with an embodiment of the present disclosure. FIG. 2 shows an example in which the feeding device 200 is an AC (Alternating Current) adapter, and the power management device 100 and the feeding device 200 are connected via a cable 300. Symbol "Vout" shown in FIG. 2 denotes a voltage output from the feeding device 200 (hereinafter referred to as an "output voltage"). In addition, symbol "Vin" shown in FIG. 2 denotes an input voltage and symbol "i" shown in FIG. 2 denotes a load current.

Herein, provided that the resistance of the cable 300 and connectors and the like of the power management device 100 and the feeding device 200 is indicated by "R," the relationship between the input voltage Vi and the output voltage Vout can be represented by the following Formula 1, for example.

$$Vin = Vout - (i \cdot R) \quad \text{(Formula 1)}$$

Herein, as the resistance R in Formula 1 can be regarded as being constant, the input voltage will drop in proportion to the load current i extracted from the feeding device 200 by the power management device 100. In addition, the output voltage Vout is determined by the feeding ability such as, for example, the power capacity of the feeding device 200. Thus, when an excessive load is applied to the feeding device 200, for example, the output voltage Vout will drop. Meanwhile, when an excessive load is not applied to the feeding device 200, that is, when the upper limit does not exceeded the current capacity of the feeding device 200, the differential value of the voltage drop levels of when the upper limit is increased by the aforementioned predetermined value (by one level) remains in a constant range. Thus, there is no possibility that the differential value will exceed the predetermined threshold related to the voltage drop level.

Accordingly, by monitoring the input voltage Vin and determining if the differential value of the voltage drop levels is greater than the predetermined threshold related to the voltage drop level, the power management device 100 can determine if the upper limit has exceeded the current capacity of the feeding device 200 regardless of the current capacity of the connected feeding device 200. Although the aforementioned description has illustrated an example in which the power management device 100 and the feeding device 200 are connected via a wire, even when the power management device 100 and the feeding device 200 are connected wirelessly, the power management device 100 can determine if the upper limit has exceeded the current capacity of the feeding device 200 in the same way as when the power management device 100 and the feeding device 200 are connected via a wire.

Figure 3:
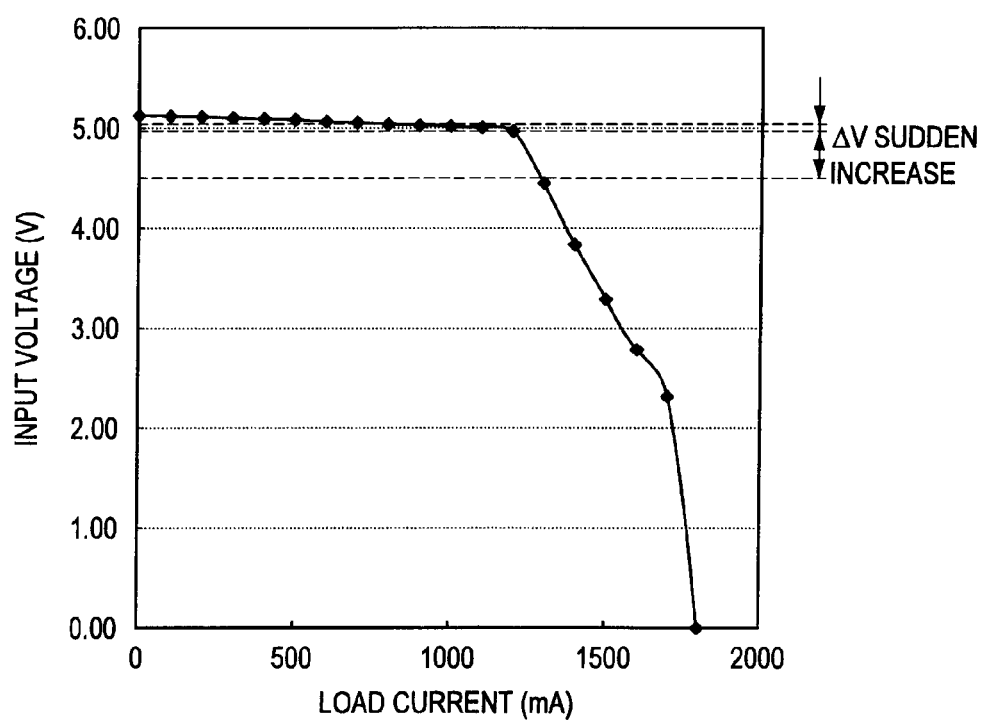
FIG. 3 is an explanatory diagram illustrating an exemplary determination method for a power management device in accordance with an embodiment of the present disclosure.

FIG. 3 is an explanatory diagram illustrating an exemplary determination method of the power management device 100 in accordance with an embodiment of the present disclosure. As shown in FIG. 3, the power management device 100 can determine that the upper limit has exceeded the current capacity of the feeding device 200 by detecting a sudden increase in the differential value $\Delta V$ of the voltage drop levels.

In addition, the power management device 100, upon determining that the upper limit has exceeded the current capacity of the feeding device 200, controls the load current by resetting the upper limit to a value not exceeding the current capacity. More specifically, the power management device 100, upon determining that the upper limit has exceeded the current capacity of the feeding device 200, controls the load current by resetting the upper limit to a value that is lower than the currently set upper limit by the aforementioned predetermined value (one level lower upper limit). By controlling the load current by adjusting the upper limit as described above, the power management device 100 can extract from the feeding device 200 the maximum load current out of a load current that is extracted such that it does not apply an excessive load to the feeding device 200.

Thus, by performing the process related to the first power management approach, the power management device 100 can stably extract a larger load current from the feeding device 200.

In addition, the power management device 100, after having reset the upper limit upon determining that the upper limit had exceeded the current capacity of the feeding device 200, need not set an upper limit that is higher than the reset upper limit for the connected feeding device 200. By adjusting the upper limit as described above, the power management device 100 can maintain a state in which no excessive load is applied to the feeding device 200.

Herein, the power management device 100 keeps storing the aforementioned reset upper limit as the maximum upper limit of the feeding device 200 until it becomes unnecessary to extract a load current from the connected feeding device 200 such as, for example, when the power management device 100 and the feeding device 200 are disconnected. Then, the power management device 100 can, when having the maximum upper limit stored therein, for example, perform the aforementioned control related to the upper limit by not setting an upper limit that is higher than the stored maximum upper limit. Note that it is needless to mention that a process that is performed by the power management device 100 in resetting the upper limit upon determining that the upper limit has exceeded the current capacity of the feeding device 200 is not limited to the example herein.

[2] Second Power Management Approach

The power management device 100 in accordance with the embodiment of the present disclosure can stably extract a larger load current from the feeding device 200 by performing the process related to the aforementioned first power management approach. However, a process related to the power management approach in accordance with the embodiment of the present disclosure is not limited to the process related to the aforementioned first power management approach. Next, a second power management approach in accordance with an embodiment of the present disclosure will be described.

As described above, the power management device 100 manages power by, upon resetting the upper limit to a higher value, determining if the upper limit has exceeded the current capacity of the feeding device 200 on the basis of a voltage drop level of the input voltage that is input from the feeding device 200. Herein, if the power management device 100 has adjusted the upper limit to a higher value without checking the actual load on the power management device 100 (or the power management device 100 and an external device that the power management device 100 supplies power to, hereinafter the same), there is a possibility that an excessive load may be applied to the feeding device 200 upon increase in the actual load on the power management device 100.

Figure 4:
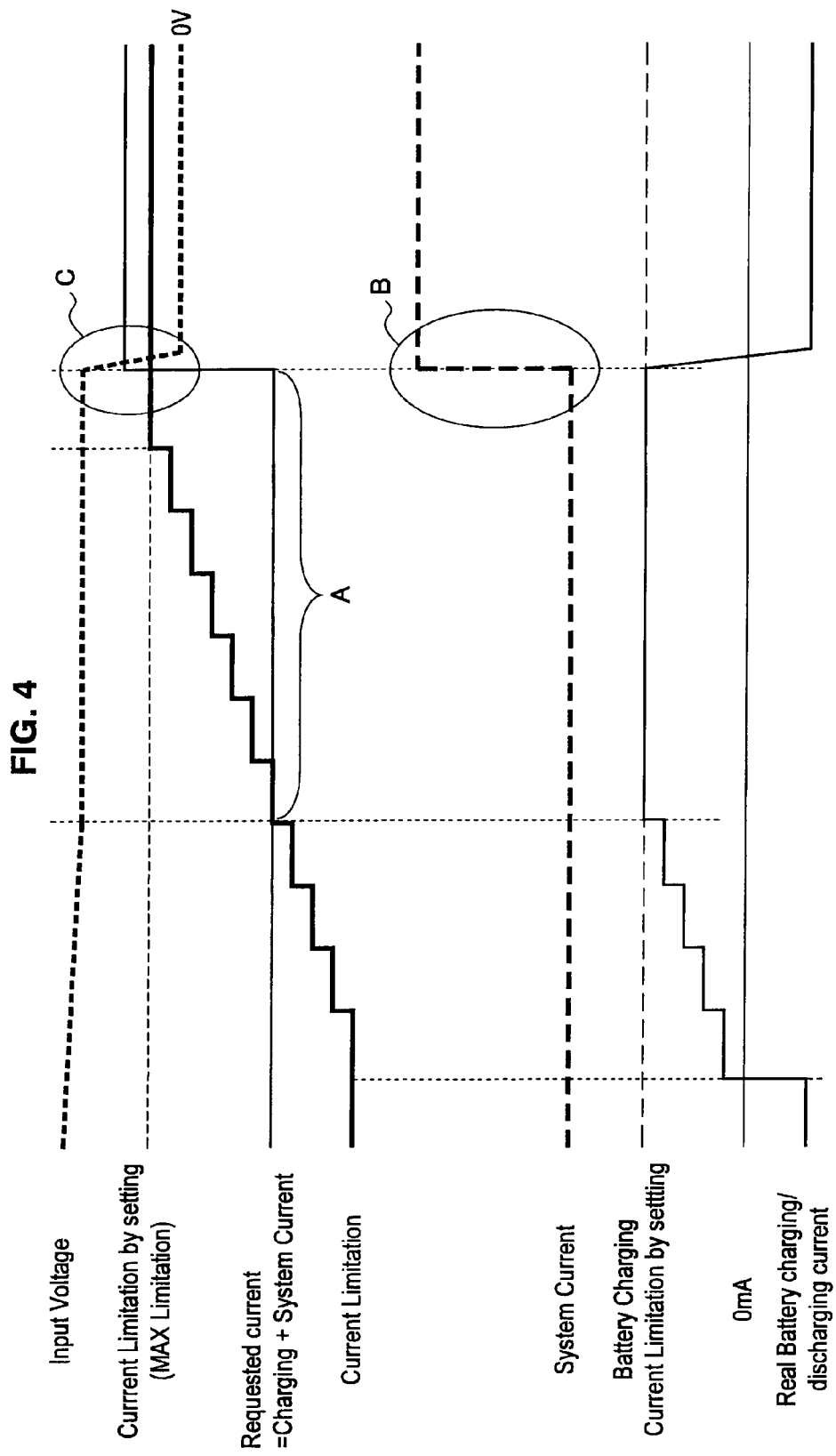
FIG. 4 is an explanatory diagram illustrating an undesirable situation that can occur if the upper limit is adjusted to a higher value without the actual load being checked.

FIG. 4 is an explanatory diagram illustrating an undesirable situation that can occur if the upper limit is adjusted to a higher value without the actual load being checked.

As indicated by symbol A in FIG. 4, when the total amount of current, which represents the total sum of current needed by the power management device 100 ("Requested Current" that corresponds to the actual load on the power management device 100), is not checked, there is a possibility that an adjustment of increasing the upper limit ("Current Limitation" in FIG. 4) may be performed even after the upper limit has exceeded the total amount of current. Herein, when the total amount of current is less than the maximum value of a load current that can be stably extracted from the feeding device 200, no excessive load will be applied to the feeding device 200 even if the upper limit is adjusted to a higher value. Therefore, there is a possibility that even if the upper limit has exceeded a load current, at the level of which an excessive load starts to be applied to the feeding device 200, the differential value of the voltage drop levels may not exceed a predetermined threshold.

When the aforementioned situation occurs, if the amount of current ("System Current" in FIG. 4) that is required to perform a process with the power management device 100 has increased as indicated by symbol B in FIG. 4, a load current extracted from the feeding device 200 suddenly increases in accordance with the upper limit, and the differential value of the voltage drop levels becomes greater than the predetermined threshold to a large degree. As a result, a sudden voltage drop in the input voltage ("Input Voltage" in FIG. 4) occurs as indicated by symbol C in FIG. 4. When such a sudden voltage drop in the input voltage occurs as indicated by symbol C in FIG. 4, there is a possibility that undesirable situations such as those stated in (a) and (b) above may occur. Further, depending on the type of the feeding devices 200, if a protection circuit thereof is activated, it may be impossible to cancel the protection state of the protection circuit unless the load current is once reset to zero by, for example, disconnecting the feeding device 200 from the power management device 100. This, however, could reduce the convenience for the user. In addition, in the aforementioned case, the operation of the power management device 100 is difficult to be continued unless the power management device 100 has an internal power supply. Further, even when the power management device 100 has an internal power supply, the operation of the power management device 100 is difficult to be continued unless the internal power supply is charged.

Thus, the power management device 100 in accordance with an embodiment of the present disclosure adjusts the upper limit to a higher value while checking the total amount of current of the power management device 100 (i.e., the actual load on the power management device 100) as a process related to the second power management approach.

More specifically, the power management device 100 compares the currently set upper limit with the total amount of current. Then, the power management device 100, if the total amount of current is greater than the currently set upper limit, increases the upper limit, and if the total amount of current is less than or equal to the currently set upper limit, does not increase the upper limit.

By adjusting the upper limit as described above, the power management device 100 can accurately determine if the upper limit has exceeded the current capacity of the feeding device 200 on the basis of a voltage drop level of the input voltage. Thus, the power management device 100 can stably extract a larger load current from the feeding device 200 by performing the process related to the second power management approach.

[Exemplary Process Related to Second Power Management Approach]

Figure 5:
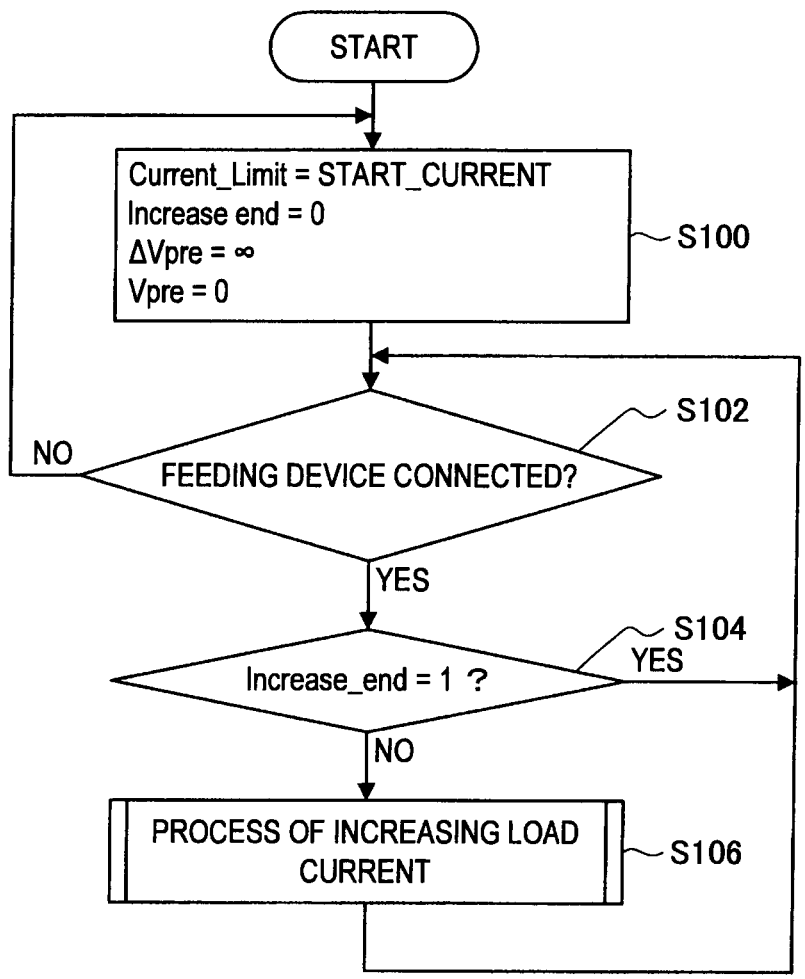
FIG. 5 is a flowchart showing an exemplary process related to a second power management approach of a power management device in accordance with an embodiment of the present disclosure.

Hereinafter, the process related to the second power management approach of the power management device 100 in accordance with the embodiment of the present disclosure will be described more specifically. FIG. 5 is a flowchart showing an exemplary process related to the second power management approach of the power management device 100 in accordance with an embodiment of the present disclosure.

The power management device 100 initializes a variable Current_Limit, a variable Increase_end, a variable ΔVpre, and a variable Vpre (S100). The variable Current_Limit indicates the upper limit of a load current. In the following description, the variable Current_Limit may also be referred to as "upper limit Current_Limit." The initial value (START_CURRENT in FIG. 5) of the variable Current_Limit herein can be, for example, 400 [mA]. However, the initial value of the variable Current_Limit is not limited thereto. The variable Increase_end indicates a type of flag used to determine if the upper limit should be adjusted to a higher value in step S104 (described below). In FIG. 5, description will be given of an example in which the power management device 100 determines that the upper limit should not be adjusted to a higher value if the variable Increase_end is "1." The variable ΔVpre and the variable Vpre are variables used in the process of step S106 (described below).

After initialing each variable in step S100, the power management device 100 determines if the feeding device 200 has been connected thereto (S102). Herein, the power management device 100 determines that the feeding device 200 has been connected thereto upon detecting an input voltage from the connected feeding device 200. However, the process of the power management device 100 in step S102 in accordance with the embodiment of the present disclosure is not limited thereto.

If the feeding device 200 is not determined to have been connected in step S102, the power management device 100 repeats the process from step S100. Note that a process that is performed by the power management device 100 when the feeding device 200 is not determined to have been connected in step S102 is not limited to the example herein. For example, the power management device 100 in accordance with the embodiment of the present disclosure can selectively perform the process of step S100 when a predetermined time has elapsed from the previous initialization, without performing the process of step S100 each time the feeding device 200 is not determined to have been connected in step S102.

If the feeding device 200 is determined to have been connected in step S102, the power management device 100 determines if the variable Increase_end is "1" (if the upper limit should not be adjusted to a higher value) (S104).

If the variable Increase_end is determined to be "1" in step S104, the power management device 100 repeats the process from step S102.

Meanwhile, if the variable Increase_end is not determined to be "1" in step S104, the power management device 100 performs a process of adjusting the upper limit to a higher value (a process of increasing a load current) (S106). Then, the power management device 100 repeats the process from step S102.

Figure 6:
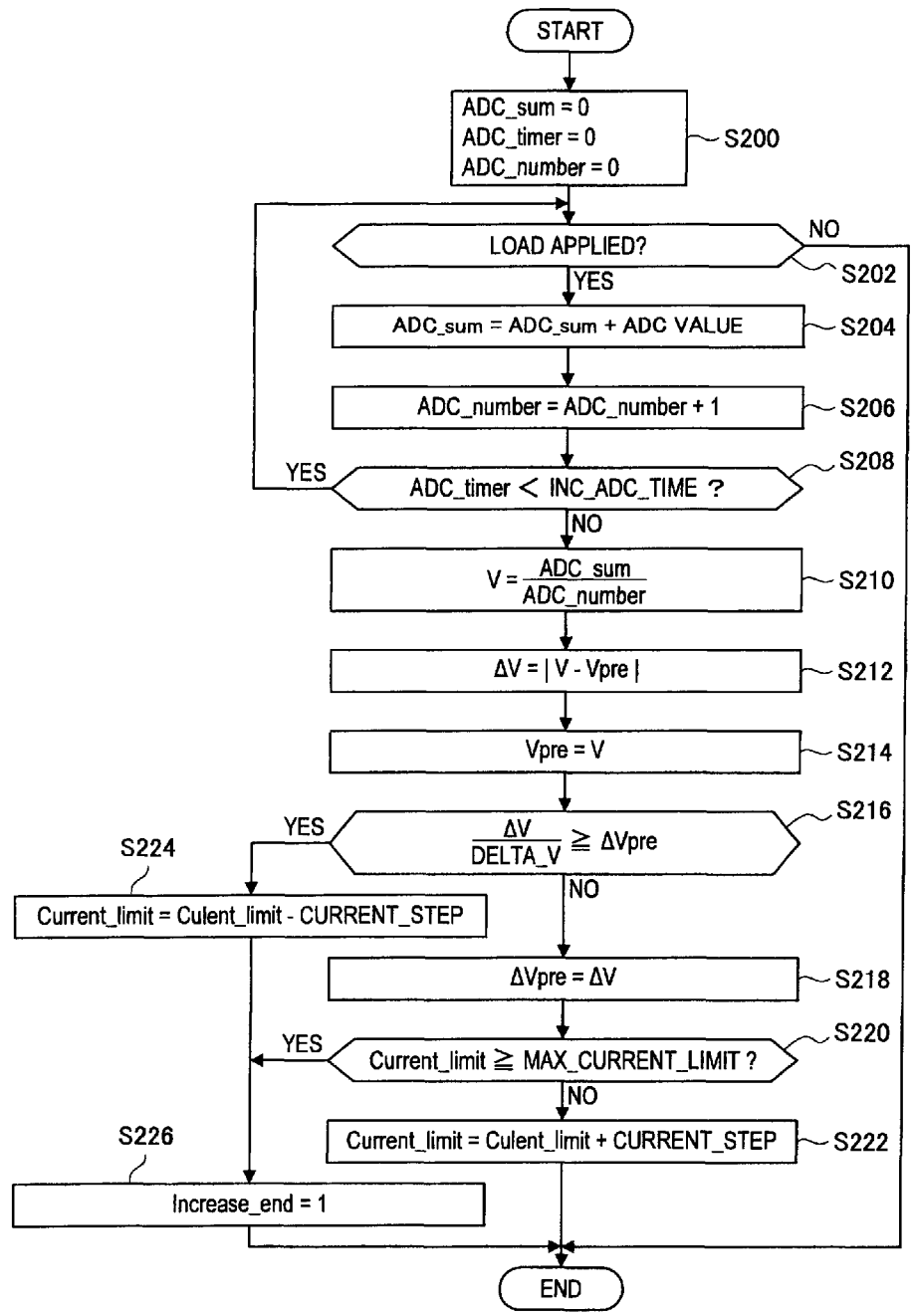
FIG. 6 is a flowchart showing an exemplary process of increasing a load current with a power management device in accordance with an embodiment of the present disclosure.

Exemplary Process of Increasing Load Current in Accordance with Embodiment of the Present Disclosure FIG. 6 is a flowchart showing an exemplary process of increasing a load current with the power management device 100 in accordance with an embodiment of the present disclosure.

The power management device 100 initializes a variable ADC_sum, a variable ADC_timer, and a variable ADC_number (S200). Herein, the variable ADC_sum indicates the sum of the input voltage (ADC value, hereinafter the same). The variable ADC_timer is a variable used to determine if the upper limit should be adjusted in step S208 (described below), and indicates the actual time that has elapsed from the start of the process of step S204 (described below), for example. The variable ADC_number is a variable used to calculate the average voltage in step S210 (described below).

After initializing each variable in step S200, the power management device 100 determines if a load is applied (S202). Herein, the power management device 100 determines that a load is applied if the total amount of current is greater than the current upper limit. However, the process of the power management device 100 in step S202 in accordance with the embodiment of the present disclosure is not limited thereto.

If a load is not determined to be applied in step S202, the power management device 100 terminates the process of increasing a load current.

Meanwhile, if a load is determined to be applied in step S202, the power management device 100 updates the variable ADC_sum on the basis of the current input voltage detected (S204). After updating the variable ADC_sum in step S204, the power management device 100 updates the variable ADC_number (S206). Though not shown in FIG. 6, the power management device 100 starts counting of the variable ADC_timer in synchronization with the update of the ADC_sum in step S204, for example. Note that the timing for the power management device 100 in accordance with the embodiment of the present disclosure to start counting the variable ADC_timer is not limited thereto. For example, counting of the variable ADC_timer can be started in synchronization with the determination that a load is applied in step S202.

After updating the variable ADC_sum and the variable ADC_number in steps S204 and S206, the power management device 100 determines if the upper limit should be adjusted on the basis of the value of the variable ADC_timer and a preset value INC_ADC_TIME (S208). Herein, the preset value INC_ADC_TIME related to step S208 can be, for example, 100 [msec]. However, the value of the preset value INC_ADC_TIME is not limited thereto. Note that the process of step S208 is not limited to the process shown in FIG. 6. For example, the power management device 100 can implement the process of step S208 by determining if the variable ADC_timer is less than or equal to the preset value INC_ADC_TIME.

If it is not determined that the upper limit should be adjusted in step S208, the power management device 100 repeats the process from S202.

Meanwhile, if it is determined that the upper limit should be adjusted in step S208, the power management device 100 calculates the average voltage V of the input voltage on the basis of the variable ADC_sum and the variable ADC_number (S210). In addition, the power management device 100 calculates the differential value ΔV of the input voltage on the basis of the average voltage V and the variable Vpre (S212). After calculating the differential value ΔV in step S212, the power management device 100 updates the variable Vpre to the average voltage V calculated in step S210 (S214).

After updating the variable Vpre in step S214, the power management device 100 determines if the differential value ΔV is greater than or equal to a predetermined threshold (S216). The process of step S216 corresponds to the process related to the aforementioned first power management approach. Note that the process of step S216 is not limited to the process shown in FIG. 6. For example, the power management device 100 can implement the process of step S216 by determining if the differential value ΔV is greater than a predetermined threshold.

FIG. 6 shows an example in which the power management device 100 performs a determination using a threshold (ΔVpre·DELTA_V), which is based on the variable ΔVpre and a preset value DELTA_V, as the aforementioned threshold. The preset value DELTA_V can be, for example, "2." However, the preset value DELTA_V in accordance with the embodiment of the present disclosure is not limited thereto. By performing the process of step S216 using a threshold that is based on the variable ΔVpre and the preset value DELTA_V as described above, the power management device 100 can determine a sudden increase in the differential value ΔV. Note that the predetermined threshold used for the power management device 100 in accordance with the embodiment of the present disclosure to perform the process of step S216 is not limited to the example herein. For example, the power management device 100 can set a fixed threshold related to a voltage drop level and perform the process of step S216 using the fixed threshold related to the voltage drop level.

If the differential value ΔV is not determined to be greater than or equal to the predetermined threshold in step S216, the power management device 100 updates the variable ΔVpre to the differential value ΔV calculated in step S212 (S218).

After updating the variable ΔVpre in step S218, the power management device 100 determines if the currently set upper limit Current_Limit is greater than or equal to the maximum value of the upper limit MAX_CURRENT_LIMIT (S220). The maximum value of the upper limit MAX_CURRENT_LIMIT herein can be, for example, 1500 [mA]. However, the maximum value of the upper limit MAX_CURRENT_LIMIT in accordance with the embodiment of the present disclosure is not limited thereto. Note that the power management device 100 can implement the process of step S220 by determining if, for example, the currently set upper limit Current_Limit is greater than the maximum value of the upper limit MAX_CURRENT_LIMIT.

If the upper limit Current_Limit is not determined to be greater than or equal to the maximum value of the upper limit MAX_CURRENT_LIMIT in step S220, the power management device 100 adjusts the upper limit Current_Limit to a higher value by a preset value CURRENT_STEP (S222). Then, the power management device 100 terminates the process of increasing a load current. The process of step S222 herein corresponds to a process of setting the upper limit Current_Limit to a higher value by one level (by a predetermined value). The preset value CURRENT_STEP can be, for example, 100 [mA]. However, the preset value CURRENT_STEP in accordance with the embodiment of the present disclosure is not limited thereto.

Meanwhile, if the upper limit Current_Limit is determined to be greater than or equal to the maximum value of the upper limit MAX_CURRENT_LIMIT in step S220, the power management device 100 updates the variable Increase_end to "1" (a value for not adjusting the upper limit to a higher value) (S226). Then, the power management device 100 terminates the process of increasing a load current.

If the differential value ΔV is not determined to be greater than or equal to the predetermined threshold in step S216, the power management device 100 performs the aforementioned processes of steps S218 to S222 and S226.

Meanwhile, if the differential value ΔV is determined to be greater than or equal to the predetermined threshold in step S216, the power management device 100 adjusts the upper limit Current_Limit to a lower value by the preset value CURRENT_STEP (S224). Herein, the process of step S224 corresponds to a process of setting the upper limit Current_Limit to a lower value by one level (by a predetermined value).

After adjusting the upper limit Current_Limit to a lower value by the preset value CURRENT_STEP in step S224, the power management device 100 updates the variable Increase_end to "1" (a value for not adjusting the upper limit to a higher value) (S226). Then, the power management device 100 terminates the process of increasing a load current.

The power management device 100 can control a load current by adjusting the upper limit through the process shown in FIG. 6, for example. Herein, the process of step S216 shown in FIG. 6 corresponds to the process related to the aforementioned first power management approach. In addition, as the power management device 100 performs the processes of steps S204 to S226 after determining the actual load in step S202, it is possible to prevent an undesirable situation that can occur if the upper limit is adjusted to a higher value as shown in FIG. 4.

The power management device 100 can implement the process related to the second power management approach by performing the processes shown in FIGS. 5 and 6, for example. Thus, the power management device 100 can stably extract a larger load current from the feeding device 200 by performing the processes shown in FIGS. 5 and 6, for example. Note that it is needless to mention that the process related to the second power management approach in accordance with the embodiment of the present disclosure is not limited to the processes shown in FIGS. 5 and 6.

Figure 7:
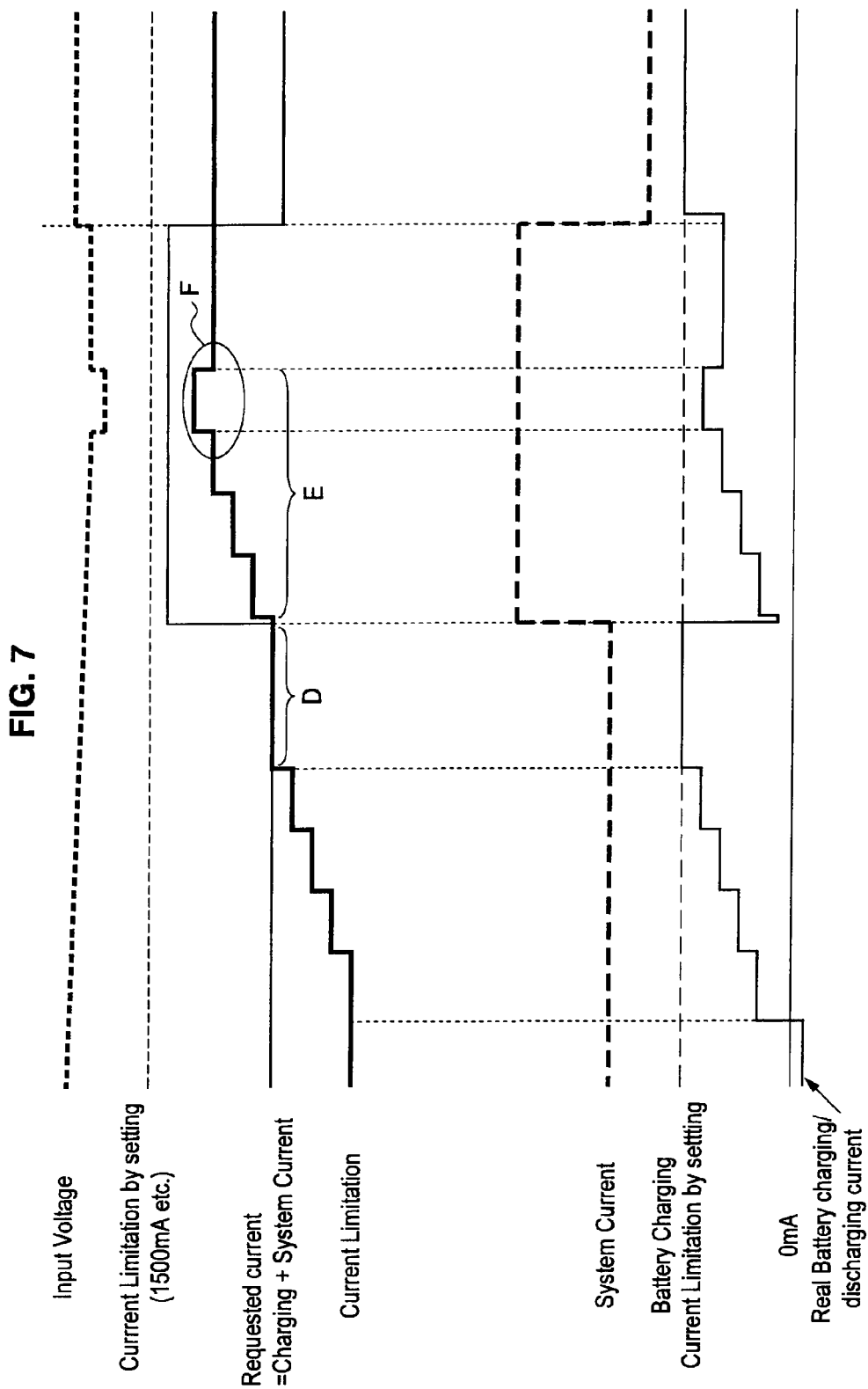
FIG. 7 is an explanatory diagram illustrating a process related to the second power management approach in accordance with an embodiment of the present disclosure.

FIG. 7 is an explanatory diagram illustrating the process related to the second power management approach in accordance with an embodiment of the present disclosure.

As described above, the power management device 100 adjusts the upper limit ("Current_Limitation" in FIG. 7) after checking the total amount of current ("Requested Current" that corresponds to the actual load on the power management device 100). Thus, when the total amount of current is not greater than the upper limit as indicated by symbol D in FIG. 7, the power management device 100 does not increase the upper limit. Accordingly, the power management device 100 can prevent undesirable situations that can occur if the upper limit is adjusted to a higher value as shown in FIG. 4.

Meanwhile, when the total amount of current has become greater than the upper limit as indicated by symbol E in FIG. 7, the power management device 100 increases the upper limit in increments of one level (in increments of a predetermined value). Then, the power management device 100 determines if the upper limit has exceeded the current capacity of the feeding device 200 (i.e., if an excessive load has started to be applied to the feeding device 200) on the basis of a voltage drop level of the input voltage. If the upper limit is determined to have exceeded the current capacity of the feeding device 200, the power management device 100 adjusts the upper limit as indicated by symbol F in FIG. 7 (which corresponds to the process related to the aforementioned first power management approach).

Accordingly, through the process related to the second power management approach, the power management device 100 can prevent undesirable situations that can occur if the upper limit is adjusted to a higher value as shown in FIG. 4, and can stably extract a larger load current from the feeding device 200.

[3] Third Power Management Approach

The power management device 100 in accordance with the embodiment of the present disclosure can stably extract a larger load current from the feeding device 200 by performing the process related to the aforementioned first power management approach or the process related to the aforementioned second power management approach. However, a process related to the power management approach in accordance with the embodiment of the present disclosure is not limited to the process related to the aforementioned first power management approach and the process related to the aforementioned second power management approach. Next, a third power management approach in accordance with an embodiment of the present disclosure will be described.

When the feeding device 200 is an AC adapter and the feeding device 200 outputs an output voltage based on a commercial power supply, for example, there may be cases in which the same load current is difficult to be extracted from the feeding device 200 depending on the circumstances such as a temperature rise of the feeding device 200 and the ambient temperature of the feeding device 200. Thus, the power management device 100 in accordance with the embodiment of the present disclosure adjusts the upper limit by monitoring the input voltage as described above. Herein, if a response time taken for the power management device 100 to increase the upper limit (i.e., to increase a load current) and a response time taken for the power management device 100 to reduce the upper limit (i.e., to reduce a load current) are constant, there is a possibility that an excessive load may be applied to the feeding device 200 upon occurrence of a fluctuation in the input voltage, for example.

Thus, as a process related to the third power management approach, the power management device 100 prevents an excessive load from being applied to the feeding device 200 as described above by varying the response time taken to increase the upper limit and the response time taken to reduce the upper limit. More specifically, when setting the upper limit to a lower value, the power management device 100 sets the upper limit in a shorter time than the time taken to set the upper limit to a higher value, thereby setting the response time taken to reduce the upper limit to be shorter than the response time taken to increase the upper limit. That is, by performing the process related to the third power management approach, the power management device 100 can more slowly and carefully set the upper limit when increasing the upper limit and can more quickly set the upper limit when reducing the upper limit.

[Exemplary Process Related to Third Power Management Approach]

Figure 8:
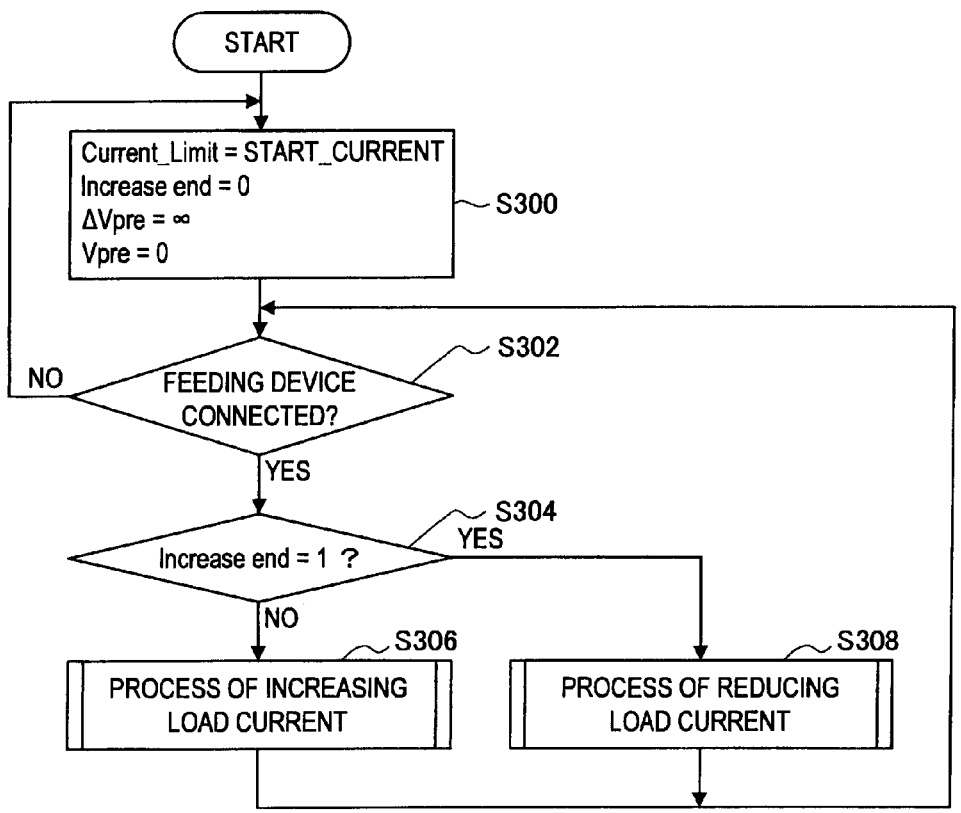
FIG. 8 is a flowchart showing an exemplary process related to a third power management approach of a power management device in accordance with an embodiment of the present disclosure.

Hereinafter, the process related to the third power management approach of the power management device 100 in accordance with an embodiment of the present disclosure will be described more specifically. FIG. 8 is a flowchart showing an exemplary process related to the third power management approach of the power management device 100 in accordance with an embodiment of the present disclosure.

The power management device 100 initializes the variable Current_Limit, the variable Increase_end, the variable ΔVpre, and the variable Vpre as in step S100 of FIG. 5 (S300).

After initializing each variable in step S300, the power management device 100 determines if the feeding device 200 has been connected thereto as in step S102 of FIG. 5 (S302).

If the feeding device 200 is not determined to have been connected in step S302, the power management device 100 repeats the process from step S300 as in the case in which the feeding device 200 is not determined to have been connected in step S102 of FIG. 5.

Meanwhile, if the feeding device 200 is determined to have been connected in step S302, the power management device 100 determines if the variable Increase_end is "1" (if the upper limit should not be adjusted to a higher value) as in step S104 of FIG. 5 (S304).

If the variable Increase_end is not determined to be "1" in step S304, the power management device 100 performs a process of adjusting the upper limit to a higher value (a process of increasing a load current) as in step S106 of FIG. 5 (S306). Then, the power management device 100 repeats the process from step S302.

Meanwhile, if the variable Increase_end is determined to be "1" in step S304, the power management device 100 performs a process of adjusting the upper limit to a lower value (a process of reducing a load current) (S308). Then, the power management device 100 repeats the process from step S302.

Figure 9:
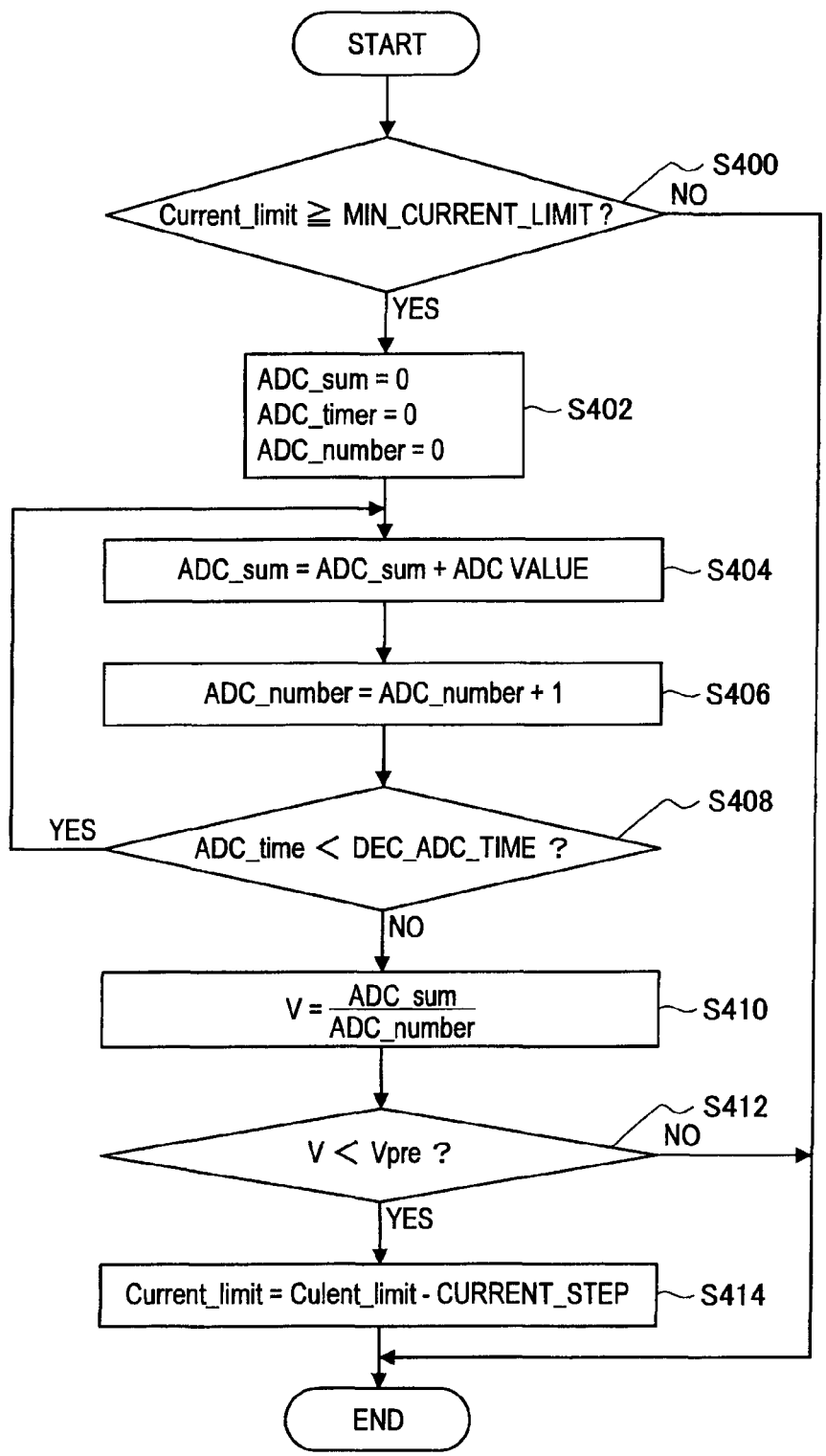
FIG. 9 is a flowchart showing an exemplary process of reducing a load current with a power management device in accordance with an embodiment of the present disclosure.

Exemplary Process of Reducing Load Current in Accordance with Embodiment of the Present Disclosure FIG. 9 is a flowchart showing an exemplary process of reducing a load current with the power management device 100 in accordance with an embodiment of the present disclosure.

The power management device 100 determines if the currently set upper limit Current_Limit is greater than or equal to the minimum value of the upper limit MIN_CURRENT_LIMIT (S400). The minimum value of the upper limit MIN_CURRENT_LIMIT herein can be, for example, 500 [mA]. However, the minimum value of the upper limit MIN_CURRENT_LIMIT in accordance with the embodiment of the present disclosure is not limited to the example herein. Note that the power management device 100 can implement the process of step S400 by determining if the currently set upper limit Current_Limit is greater than the minimum value of the upper limit MIN_CURRENT_LIMIT.

If the upper limit Current_Limit is not determined to be greater than or equal to the minimum value of the upper limit MIN_CURRENT_LIMIT in step S400, the power management device 400 terminates the process of reducing a load current.

Meanwhile, if the upper limit Current_Limit is determined to be greater than or equal to the minimum value of the upper limit MIN_CURRENT_LIMIT in step S400, the power management device 100 initializes the variable ADC_sum, the variable ADC_timer, and the variable ADC_timer as in step S200 of FIG. 6 (S402).

After initializing each variable in step S402, the power management device 100 updates the variable ADC_sum on the basis of the current input voltage detected as in step S204 of FIG. 6 (S404). Then, after updating the variable ADC_sum in step S404, the power management device 100 updates the variable ADC_number as in step S206 of FIG. 6 (S406). Though not shown in FIG. 9, the power management device 100 starts counting of the variable ADC_timer in synchronization with the update of the variable ADC_sum in step S404, for example.

After updating the variable ADC_sum and the variable ADC_number in steps S404 and S406, the power management device 100 determines if the upper limit should be adjusted on the basis of the value of the variable ADC_timer and a preset value DEC_ADC_TIME (S408). Herein, if the preset value INC_ADC_TIME is 100 [msec], for example, the preset value DEC_ADC_TIME related to step S408 can be 50 [msec]. However, the preset value DEC_ADC_TIME is not limited to the example herein. For example, the process of step S408 can be performed using any preset value DEC_ADC_TIME that is less than the preset value INC_ADC_TIME and is greater than zero. In addition, the process of step S408 is not limited to the process shown in FIG. 9. For example, the power management device 100 can implement the process of step S408 by determining if the value of the variable ADC_timer is less than or equal to the preset value DEC_ADC_TIME.

If it is not determined that the upper limit should be adjusted in step S408, the power management device 100 repeats the process from step S404.

Meanwhile, if it is determined that the upper limit should be adjusted in step S408, the power management device 100 calculates the average voltage V of the input voltage on the basis of the variable ADC_sum and the variable ADC_number as in step S210 of FIG. 6 (S410).

After calculating the average voltage V in step S410, the power management device 100 determines if the average voltage V is less than the variable Vpre (S412). Note that the process of step S412 is not limited to the process shown in FIG. 9. For example, the power management device 100 can implement the process of step S412 by determining if the average voltage V is less than or equal to the variable Vpre.

If the average voltage V is not determined to be less than the variable Vpre in step S412, the power management device 100 terminates the process of reducing a load current.

Meanwhile, if the average voltage V is determined to be less than the variable Vpre in step S412, the power management device 100 adjusts the upper limit Current_Limit to a lower value by the preset value CURRENT_STEP as in step S224 of FIG. 6 (S414). Then, the power management device 100 terminates the process of reducing a load current.

The power management device 100 can control a load current by adjusting the upper limit through the process shown in FIG. 9, for example. Herein, the power management device 100 determines if adjustment of the upper limit should be started using the preset value DEC_ADC_TIME that is lower than the preset value INC_ADC_TIME. Thus, as the power management device 100 can, in setting the upper limit to a lower value, set the upper limit in a shorter time than the time taken to set the upper limit to a higher value, it is possible to set the response time taken to reduce the upper limit to be shorter than the response time taken to increase the upper limit.

As the power management device 100 can implement the process related to the third power management approach by performing the processes shown in FIG. 8 and FIG. 9, for example, it is possible to prevent an excessive load from being applied to the feeding device 200 upon occurrence of a fluctuation in the input voltage, for example. In addition, as the process shown in FIG. 8 includes a similar process to that of the second power management approach shown in FIG. 5, the power management device 100 can exert a similar advantageous effect to that when the process related to the second power management approach shown in FIG. 5 is performed.

Therefore, the power management device 100 can stably extract a larger load current from the feeding device 200 by performing the processes shown in FIGS. 8 and 9, for example. Note that it is needless to mention that the process related to the third power management approach in accordance with the embodiment of the present disclosure is not limited to the processes shown in FIGS. 8 and 9.

Figure 10:
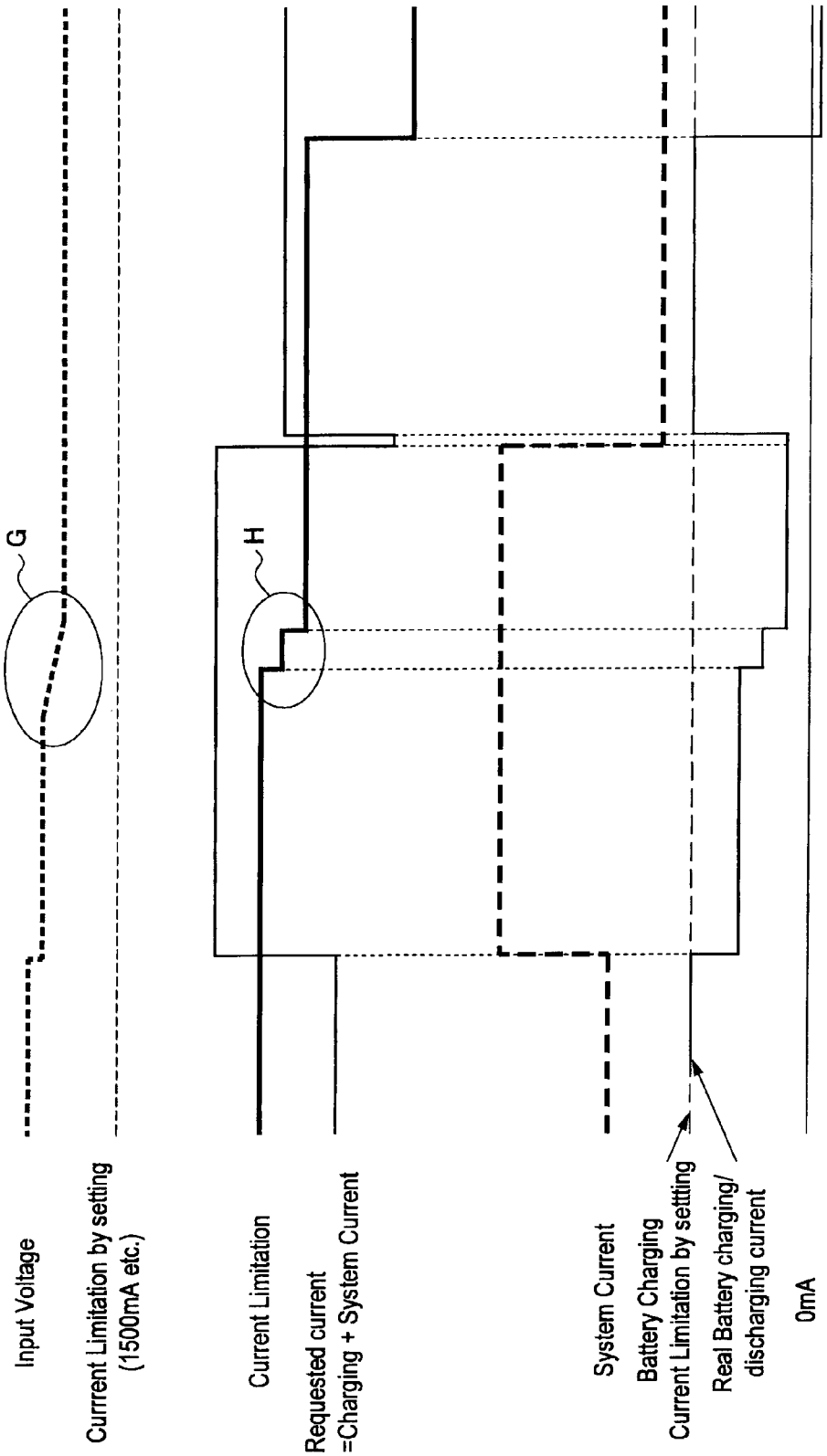
FIG. 10 is an explanatory diagram illustrating a process related to the third power management approach in accordance with an embodiment of the present disclosure.

FIG. 10 is an explanatory diagram illustrating the third power management approach in accordance with an embodiment of the present disclosure.

The power management device 100 can, when a fluctuation in the input voltage occurs as indicated by symbol G in FIG. 10, reduce the upper limit as indicated by symbol H in FIG. 10 in a shorter time than when increasing the upper limit as indicated by symbol E in FIG. 7. Accordingly, the power management device 100 can prevent an excessive load from being applied to the feeding device 200, and can further reduce the possibilities that undesirable situations such as those stated in (a) and (b) above may occur due to an excessive load being applied to the feeding device 200.

Power Management Device in Accordance with Embodiment of the Present Disclosure

Figure 11:
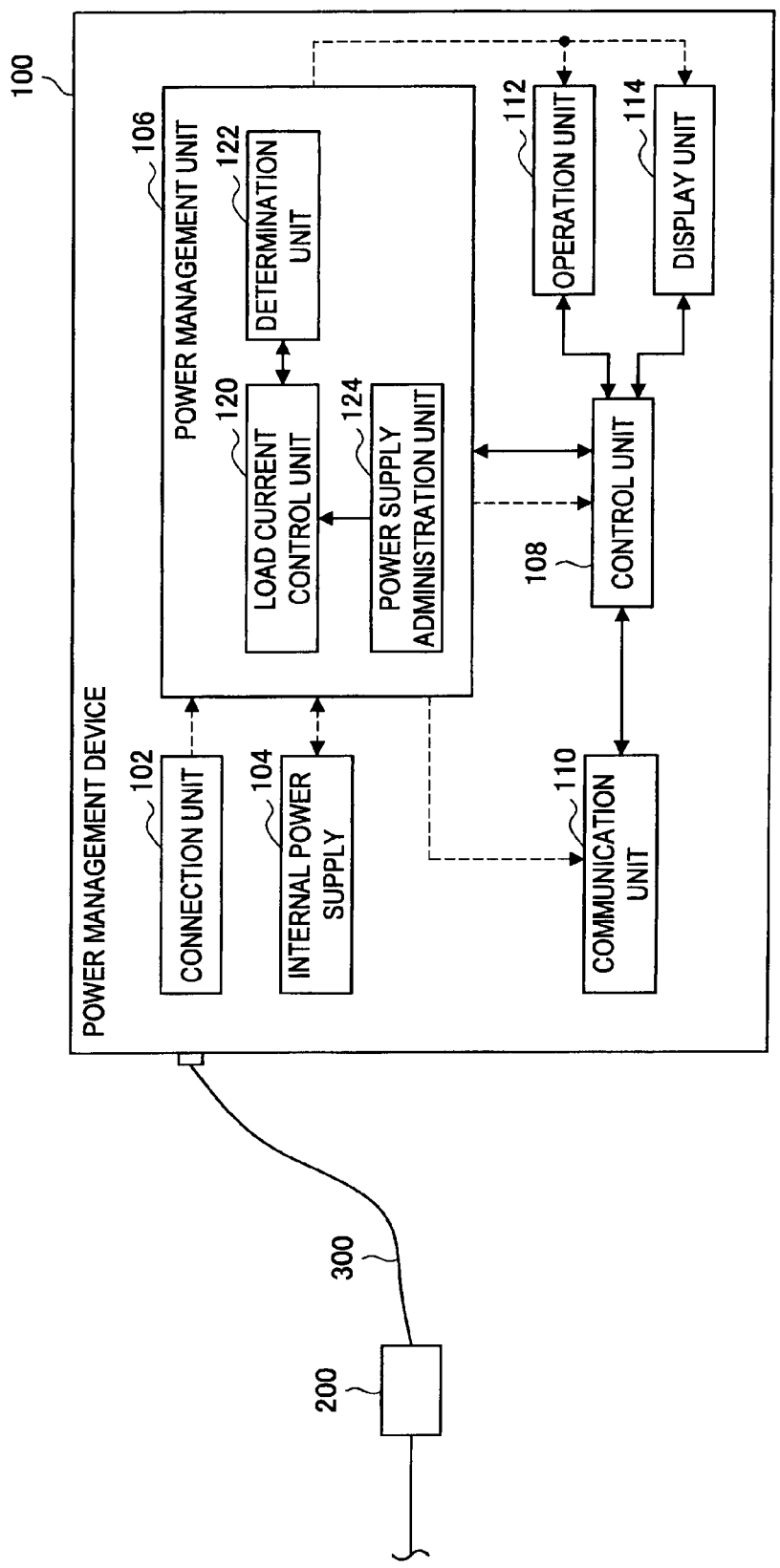
FIG. 11 is a block diagram showing an exemplary configuration of a power management device in accordance with an embodiment of the present disclosure.

Next, an exemplary configuration of the power management device 100 that can implement the process related to the power management approach in accordance with the aforementioned embodiment of the present disclosure will be described. FIG. 11 is a block diagram showing an exemplary configuration of the power management device 100 in accordance with an embodiment of the present disclosure. FIG. 11 also shows the feeding device 200 and the cable 300.

The power management device 100 includes a connection unit 102, an internal power supply 104, a power management unit 106, a control unit 108, a communication unit 110, an operation unit 112, and a display unit 114.

The power management device 100 can also include ROM (Read Only Memory; not shown), RAM (Random Access Memory; not shown), a storage unit (not shown), and the like. The components of the power management device 100 are connected via buses as data transmission channels, for example. Herein, the ROM (not shown) stores control data such as programs and operation parameters used by the control unit 108, for example. The RAM (not shown) temporarily stores programs executed by the control unit 108, for example.

The storage unit (not shown) is storage means of the power management device 100, and stores various data such as applications. The storage unit (not shown) herein can be, for example, a magnetic recording medium such as a hard disk; or nonvolatile memory such as EEPROM (Electrically Erasable and Programmable Read Only Memory), flash memory, MRAM (Magnetoresistive Random Access Memory), FeRAM (Ferroelectric Random Access Memory), or PRAM (Phase change Random Access Memory). In addition, the power management device 100 can also include a storage unit (not shown) configured to be removable from the power management device 100.

[Exemplary Hardware Configuration of Power Management Device 100]

Figure 12:
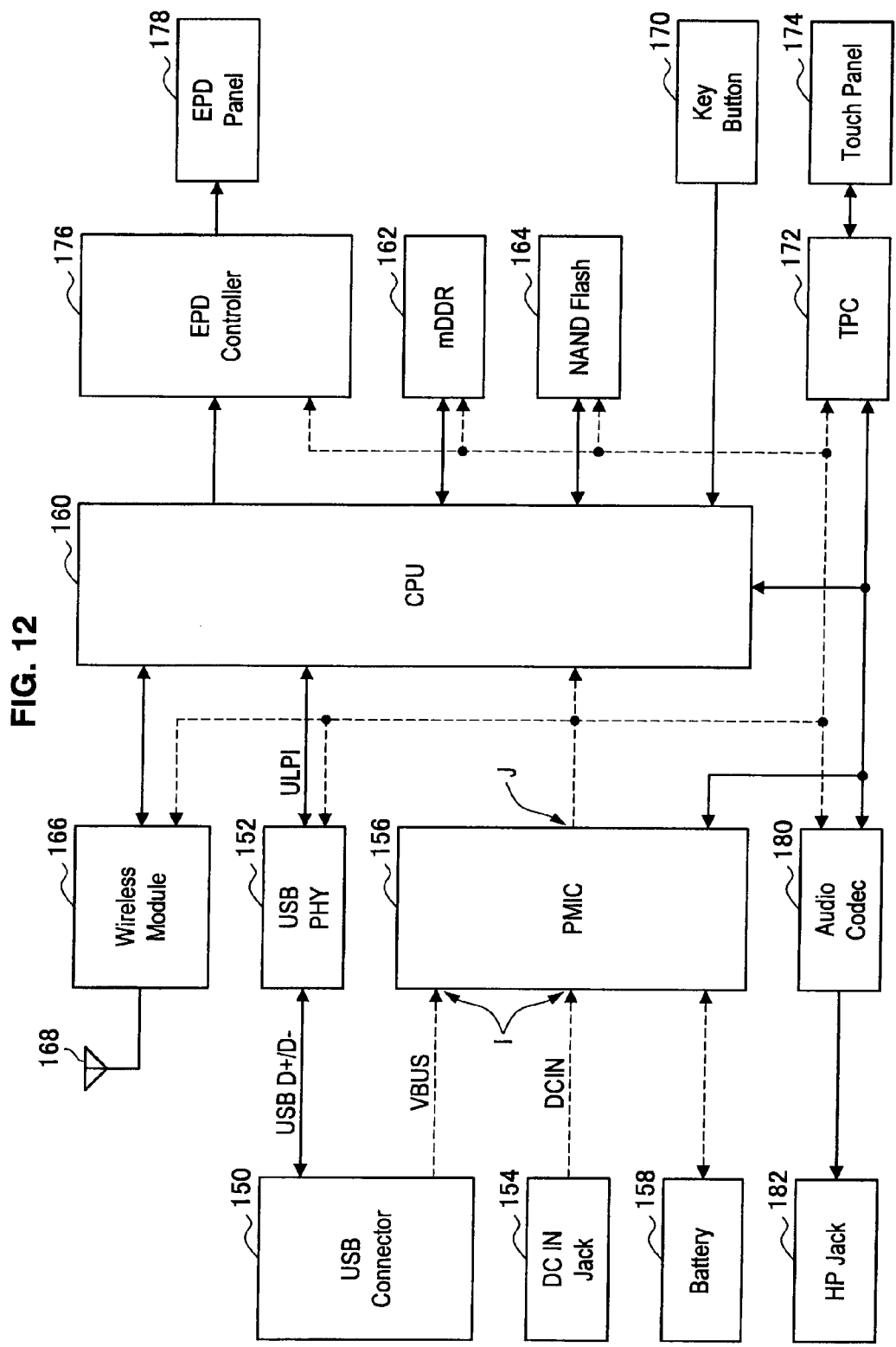
FIG. 12 is an explanatory diagram showing an exemplary hardware configuration of a power management device in accordance with an embodiment of the present disclosure.

FIG. 12 is an explanatory diagram showing an exemplary hardware configuration of the power management device 100 in accordance with an embodiment of the present disclosure. Referring to FIG. 12, the power management device 100 includes, for example, a USB Connector 150, a USB PHY 152, a DC IN Jack 154, a PMIC 156, a Battery 158, a CPU 160, a mDDR 162, a NAND Flash 164, a Wireless Module 166, an antenna 168, a Key Button 170, a TPC 172, a Touch Panel 174, an EPD Controller 176, an EPD Panel 178, an Audio Codec 180, and an HP Jack 182.

Each of the USB Connector 150 and the DC IN Jack 154 is connection means provided for the power management device 100 to connect to the feeding device 200 via the cable 300, and serves as the connection unit 102. Although FIG. 12 shows an example in which the power management device 100 has two connection units 102 including the USB Connector 150 and the DC IN Jack 154, the configuration of the power management device 100 in accordance with the embodiment of the present disclosure is not limited thereto. For example, the power management device 100 in accordance with the embodiment of the present disclosure can have either one of the USB Connector 150 or the DC IN Jack 154.

The PMIC 156 is an IC having integrated therein various circuits such as a processing circuit for implementing a power management (PM) function and nonvolatile memory capable of storing various variables that are updated when the process related to the aforementioned power management approach is executed, various preset values that are used for the process related to the aforementioned power management approach, and the like. The PMIC 156 serves as the power management unit 106 that takes the initiative in performing the process related to the aforementioned first power management approach to the process related to the aforementioned third power management approach. The PMIC 156 monitors the input voltage at a point indicated by symbol I in FIG. 12, and detects a current flowing through a point indicated by symbol J in FIG. 12 as the "System Current" in FIGS. 7 and 10. Herein, when the power management device 100 in accordance with the embodiment of the present disclosure is not the entire device (receiving device) shown in FIG. 12 but the PMIC 156, the current flowing through the point indicated by symbol J in FIG. 12 corresponds to the current needed by an external device. In addition, the PMIC 156 controls charging and discharging of the Battery 158.

The Battery 158 serves as the internal power supply 104. The Battery 158 is charged in accordance with a current supplied from the PMIC 156 and supplies power to the PMIC 156 by discharging. The Battery 158 herein can be, for example, a lithium-ion alloy secondary battery or a lithium-ion polymer secondary battery.

The CPU 160 includes a CPU (Central Processing Unit), various processing circuits, and the like, and serves as the control unit 108 for controlling the entire power management device 100.

The mDDR 162 serves as the RAM (not shown) and temporarily stores programs and the like executed by the CPU 160. In addition, the NAND Flash 164 serves as a storage unit (not shown) and stores various data such as applications.

Each of the Wireless Module 166 and the antenna 168 is communication means provided for the power management device 100 to communicate with an external device such as a server over a network (or directly), and serves as the communication unit 110. The Wireless Module 166 and the antenna 168 herein can be, for example, an IEEE 802.11g port and a transmitter/receiver circuit; an IEEE 802.15.4 port and a transmitter/receiver circuit; or a communication antenna and an RF (Radio Frequency) circuit. Note that the power management device 100 in accordance with the embodiment of the present disclosure need not include devices for performing wireless communication such as those described above. For example, the power management device 100 in accordance with the embodiment of the present disclosure can have devices for performing wired communication with an external device over a network (or directly) such as a LAN (Local Area Network) terminal and a transmitter/receiver circuit.

Each of the Key Button 170, the TPC 172, and the Touch Panel 174 is operation means provided for the power management device 100 to be able to be operated by the user, and serves as the operation unit 112. Note that the power management device 100 in accordance with the embodiment of the present disclosure is not limited to the configuration having the Key Button 170, the TPC 172, and the Touch Panel 174 as the operation unit 112. For example, the power management device 100 in accordance with the embodiment of the present disclosure can have a cursor key or a rotary selector such as a jog dial. In addition, the power management device 100 in accordance with the embodiment of the present disclosure can be configured to be connectable to an external operation device such as a keyboard or a mouse.

Each of the EPD Controller 176 and the EPD Panel 178 is display means provided for the power management device 100, and serves as the display unit 114 capable of displaying various information on a display screen. Note that the power management device 100 in accordance with the embodiment of the present disclosure is not limited to the configuration having a display device and a controller, which are connected via an EDP (Embedded Display Port) like the EPD Controller 176 and the EPD Panel 178, as the display unit 114. For example, the power management device 100 in accordance with the embodiment of the present disclosure can have an organic EL display (an organic ElectroLuminescence display, or also referred to as an OLED display (Organic Light Emitting Diode display)) as the display unit 114.

Each of the Audio Codec 180 and the HP Jack 182 is audio output means provided for the power management device 100, and serves as an audio output unit (not shown) for outputting audio (including music) in accordance with audio data transmitted from the CPU 160, for example. Note that the power management device 100 in accordance with the embodiment of the present disclosure is not limited to the configuration having the Audio Codec 180 and the HP Jack 182 as the audio output unit (not shown). For example, the power management device 100 in accordance with the embodiment of the present disclosure can have an audio output device such as a DSP (Digital Signal Processor), an amplifier, or a speaker as the audio output unit (not shown).

The power management device 100 with the configuration shown in FIG. 12 performs the process related to the power management approach in accordance with the embodiment of the present disclosure. Note that the hardware configuration of the power management device 100 in accordance with the embodiment of the present disclosure is not limited to the configuration shown in FIG. 12. For example, the power management device 100 in accordance with the embodiment of the present disclosure can be the PMIC 156 shown in FIG. 12. The power management device 100 being the PMIC 156 means that FIG. 12 shows a receiving device with a built-in power management device 100, and devices other than the PMIC 156 in FIG. 12 are external devices seen from the power management device 100. Even in such a case, the power management device 100 in accordance with the embodiment of the present disclosure can perform the process related to the power management approach in accordance with the aforementioned embodiment of the present disclosure. In addition, the power management device 100 in accordance with the embodiment of the present disclosure can have a configuration that does not include any given device among the devices other than the PMIC 156 shown in FIG. 12 and can also have a configuration that further includes another device.

Referring again to FIG. 11, the components of the power management device 100 will now be described. The connection unit 102 is connection means provided for the power management device 100 to connect to the feeding device 200 via the cable 300. The connection unit 102 can be, for example, the USB Connector 150 to which the feeding device 200 that complies with the USB standard is connected or the DC IN Jack 154 to which an AC adapter (an example of the feeding device 200) is connected as shown in FIG. 12.

Charging and discharging of the internal power supply 104 are controlled by the power management unit 106. The internal power supply 104 is charged in accordance with a current supplied from the power management unit 106 and supplies power to the power management unit 106 by discharging. The internal power supply 104 herein can be, for example, a lithium-ion alloy secondary battery or a lithium-ion polymer secondary battery.

The power management unit 106 includes a load current control unit 120, a determination unit 122, and a power supply administration unit 124, and serves to take the initiative in performing the process related to the power management approach in accordance with the embodiment of the present disclosure. The power management unit 106 herein includes, for example, various circuits for implementing the power management function (or an IC in which the various circuits are integrated).

The load current control unit 120 controls a load current supplied from the feeding device 200 that is connected to the connection unit 102.

More specifically, the load current control unit 120 sets an upper limit on a load current supplied from the feeding device 200 that is connected to the connection unit 102, and controls the load current on the basis of the set upper limit. Herein, the load current control unit 120, when changing (adjusting) the currently set upper limit, resets the upper limit in increments or decrements of a predetermined value. Then, if the determination unit 122 has determined that the upper limit has exceeded the current capacity of the feeding device 200, the load current control unit 120 controls the load current by resetting the upper limit to a value not exceeding the current capacity. With such control of the load current control unit 120, the power management device 100 can implement the process related to the aforementioned first power management approach.

In addition, the load current control unit 120 compares the currently set upper limit with information on the total amount of current transmitted from the power supply administration unit 124, and adjusts the upper limit on the basis the comparison result. More specifically, the load current control unit 120, when the total amount of current is greater than the currently set upper limit, increases the upper limit, and when the total amount of current is less than or equal to the currently set upper limit, does not increase the upper limit. With such control of the load current control unit 120, the power management device 100 can implement the process related to the aforementioned second power management approach.

Further, the load current control unit 120 can separately set the time for setting the upper limit to a lower value and the time for setting the upper limit to a higher value. For example, the load current control unit 120 can, when setting the upper limit to a lower value, set the upper limit in a shorter time than the time taken to set the upper limit to a higher value. With such control of the load current control unit 120, the power management device 100 can implement the process related to the aforementioned third power management approach.

In performing the process related to the aforementioned first power management approach to the process related to the aforementioned third power management approach, the load current control unit 120, if the determination unit 122 has determined that the upper limit had exceeded the current capacity of the feeding device 200, resets the upper limit to a value that is lower than the currently set upper limit by a predetermined value (one level lower upper limit). Accordingly, the load current control unit 120 can extract from the feeding device 200 the maximum load current out of a load current that is extracted such that no excessive load is applied to the feeding device 200.

Meanwhile, the load current control unit 120, after having reset the upper limit to a lower value by a predetermined value when the determination unit 122 had determined that the upper limit had exceeded the current capacity of the feeding device 200, need not set an upper limit that is higher than the reset upper limit. As the load current control unit 120 adjusts the upper limit as described above, a state in which no excessive load is applied to the feeding device 200 can be maintained.

The load current control unit 120 controls a load current supplied from the feeding device 200 that is connected to the connection unit 102 by performing the aforementioned process, for example.

The determination unit 122, when the load current control unit 120 has reset the currently set upper limit to a higher value, determines if the upper limit has exceeded the current capacity of the feeding device 200 on the basis of a voltage drop level of the input voltage that is input from the feeding device 200. More specifically, when the load current control unit 120 has reset the currently set upper limit to a higher value, the determination unit 122 calculates the differential value between a voltage drop level corresponding to the current reset (a first voltage drop level) and a voltage drop level corresponding to the previous reset (a second voltage drop level). Then, the power management device 100, if the differential value is greater than a predetermined threshold related to the voltage drop level, determines that the upper limit has exceeded the current capacity of the feeding device 200.

The power supply administration unit 124 manages power supply to the power management device 100 or to the power management device 100 and an external device. In addition, the power supply administration unit 124 transmits information on the total amount of current to the load current control unit 120.

The power management unit 106 serves to take the initiative in performing the process related to the power management approach in accordance with the embodiment of the present disclosure by having the load current control unit 120, the determination unit 122, and the power supply administration unit 124, for example. Note that the configuration of the power management unit 106 of the power management device 100 in accordance with the embodiment of the present disclosure is not limited to the example shown in FIG. 11. For example, the power management device 100 in accordance with the embodiment of the present disclosure can have any configuration that can implement the process related to the aforementioned first power management approach to the process related to the aforementioned third power management approach.

The control unit 108 includes, for example, a CPU and an integrated circuit in which various processing circuits are integrated, and serves to control the entire power management device 100.

The communication unit 110 is communication means of the power management device 100, and communicates with an external device (not shown) such as a server over a network (or directly). The communication unit 110 herein can be, for example, an IEEE 802.11g port and a transmitter/receiver circuit; an IEEE 802.15.4 port and a transmitter/receiver circuit; a communication antenna and an RF (Radio Frequency) circuit; or a LAN (Local Area Network) terminal and a transmitter/receiver circuit.

The operation unit 112 is operation means provided for the power management device 100 to be able to be operated by the user. With the operation unit 112, the power management device 100 can be operated by the user and can perform a process desired by the user in response to the operation of the user. The operation unit 112 herein can be, for example, a button, a cursor key, or a touch panel.

The display unit 114 is display means of the power management device 100, and displays various information on the display screen. A screen displayed on the display screen of the display unit 114 can be, for example, a display screen for displaying content such as an image (moving image/still image), or an operation screen for causing the power management device 100 to perform a desired operation. The display unit 114 herein can be, for example, a display device connected with an EDP such as a liquid crystal display (LCD) or an organic EL display.

With the configuration shown in FIG. 11, the power management device 100 can implement the process related to the power management approach in accordance with the embodiment of the present disclosure. Thus, with the configuration shown in FIG. 11, for example, the power management device 100 can stably extract a larger load current from the feeding device 200. Note that it is needless to mention that the configuration of the power management device 100 in accordance with the embodiment of the present disclosure is not limited to the example shown in FIG. 11.

As described above, the power management device 100 in accordance with the embodiment of the present disclosure sets an upper limit on a load current supplied from the feeding device 200 that is connected to the connection unit 102, and controls the load current on the basis of the set upper limit. Herein, the power management device 100, when changing (adjusting) the currently set upper limit, resets the upper limit in increments or decrements of a predetermined value. Then, the power management device 100, upon determining that the upper limit has exceeded the current capacity of the feeding device 200, controls the load current by resetting the upper limit to a value not exceeding the current capacity. More specifically, the power management device 100, upon determining that the upper limit has exceeded the current capacity of the feeding device 100, controls the load current by resetting the upper limit to a value that is lower than the currently set upper limit by a predetermined value (one level lower upper limit). By controlling the load current by adjusting the upper limit as described above, the power management device 100 can extract from the feeding device 200 the maximum load current out of a load current that is extracted such that no excessive load is applied to the feeding device 200. Thus, the power management device 100 can stably extract a larger load current from the feeding device 200 (the process related to the first power management approach).

In addition, the power management device 100 compares the currently set upper limit with the total amount of current, and adjusts the upper limit on the basis of the comparison result. More specifically, the power management device 100, if the total amount of current is greater than the currently set upper limit, increases the upper limit, and if the total amount of current is less than or equal to the currently set upper limit, does not increase the upper limit. By performing such control, the power management device 100 can prevent undesirable situations that can occur if the upper limit is adjusted to a higher value as shown in FIG. 4, and can stably extract a larger load current from the feeding device 200 (the process related to the second power management approach).

Further, the power management device 100 prevents an excessive load from being applied to the feeding device 200 by varying the response time taken to increase the upper limit and the response time taken to reduce the upper limit. More specifically, the power management device 100, when setting the upper limit to a lower value, sets the upper limit in a shorter time than the time taken to increase the upper limit, thereby setting the response time taken to reduce the upper limit to be shorter than the response time taken to increase the upper limit. By performing such control, the power management device 100 can further prevent an excessive load from being applied to the feeding device 200 upon occurrence of a fluctuation in the input voltage, for example (the process related to the third power management approach).

Thus, the power management device 100 can stably extract a larger load current from the feeding device 200 regardless of the power capacity of the connected feeding device 200.

Although the power management device 100 has been described as an embodiment of the present disclosure, the embodiment of the present disclosure is not limited thereto. The embodiment of the present disclosure can be applied to various devices that can be driven with power obtained from a feeding device connected thereto via a wire or wirelessly such as, for example, computers such as PCs (Personal Computers) or servers, electric book readers, portable communication devices such as portable phones, video/music reproducing devices (or video/music recording/reproducing devices), and portable game machines. In addition, the power management device 100 in accordance with the embodiment of the present disclosure can be applied to an integrated circuit such as, for example, a PMIC, and can be built in a device (a receiving device) that is driven with power obtained from a feeding device connected thereto via a wire or wirelessly.

Although the feeding device 200 has been described as an embodiment of the present disclosure, the embodiment of the present disclosure is not limited thereto. The embodiment of the present disclosure can be applied to various devices that can supply power to a power management device connected thereto via a wire or wirelessly such as, for example, AC adapters or devices that comply with the USB standard.

Program in Accordance with Embodiment of the Present Disclosure

Using a program for causing a computer to function as the power management device in accordance with the embodiment of the present disclosure (e.g., a program for causing a computer to function as the power managing unit in accordance with the embodiment of the present disclosure (a program for causing a computer to execute the process related to the power management approach in accordance with the aforementioned embodiment of the present disclosure)) allows a larger load current to be stably extracted from a connected feeding device.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, the power management device in accordance with the embodiment of the present disclosure can separately have the load current control unit 120, the determination unit 122, and the power supply administration unit 124 as individual units (e.g., can implement each unit with an individual processing circuit).

The aforementioned description has illustrated that a program (a computer program) for causing a computer to function as the power management device in accordance with the embodiment of the present disclosure can be provided. Furthermore, an embodiment of the present disclosure can also provide a storage medium having such a program stored therein.

The aforementioned configuration merely shows an exemplary embodiment of the present disclosure. It is needles to mention that such a configuration falls within the technical scope of the present disclosure.

The present disclosure contains subject matter related to that disclosed in Japanese Priority Patent Application JP 2010-190925 filed in the Japan Patent Office on Aug. 27, 2010, the entire content of which is hereby incorporated by reference.

What is claimed is:

1. A power management device comprising:
   a load current control unit configured to set an upper limit on a load current supplied from a feeding device that is connected to the power management device and configured to control the load current on the basis of the set upper limit; and
   a determination unit configured to, when the load current control unit has reset the upper limit to a higher value, determine if the upper limit has exceeded a current capacity of the feeding device on the basis of a voltage drop level of an input voltage input from the feeding device, wherein
   the load current control unit resets the upper limit in increments or decrements of a predetermined value when changing the set upper limit, and
   the load current control unit, when the determination unit has determined that the upper limit had exceeded the current capacity of the feeding device, controls the load current by resetting the upper limit to a value not exceeding the current capacity.

2. The power management device according to claim 1, further comprising a power supply administration unit configured to manage power supply to the power management device or to the power management device and an external device, wherein
   the load current control unit compares the set upper limit with a total amount of current transmitted from the power supply administration unit, the total amount of current representing a total sum of current needed by the power management device or by the power management device and the external device, and
   the load current control unit increases the upper limit if the total amount of current is greater than the set upper limit, and does not increase the upper limit if the total amount of current is less than or equal to the set upper limit.

3. The power management device according to claim 2, wherein the load current control unit, when resetting the upper limit to a lower value, resets the upper limit in a shorter time than a time taken to increase the upper limit.

4. The power management device according to claim 1, wherein the load current control unit, when the determination unit has determined that the upper limit had exceeded the current capacity of the feeding device, resets the upper limit to a value that is lower than the currently set upper limit by the predetermined value.

5. The power management device according to claim 4, wherein the load current control unit, after having reset the upper limit when the determination unit had determined that the upper limit had exceeded the current capacity of the feeding device, does not set an upper limit that is greater than the reset upper limit.

6. The power management device according to claim 1, wherein
   the determination unit, when the load current control unit has reset the set upper limit to a higher value, calculates a differential value between a first voltage drop level representing a voltage drop level at the current reset and a second voltage drop level representing a voltage drop level at the previous reset, and
   the determination unit, if the differential value is greater than a predetermined threshold or is greater than or equal to the predetermined threshold, determines that the upper limit has exceeded the current capacity of the feeding device.

* * * * *